US011632681B2

(12) United States Patent
Ahmed et al.

(10) Patent No.: US 11,632,681 B2
(45) Date of Patent: Apr. 18, 2023

(54) SELF-CONFIGURING MULTIPLE-ANTENNA SYSTEM

(71) Applicant: Lennox Industries Inc., Richardson, TX (US)

(72) Inventors: Mansoor Ahmed, Parker, TX (US); Steve Lazar, Fair Oaks Ranch, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 17/874,623

(22) Filed: Jul. 27, 2022

(65) Prior Publication Data

US 2022/0361010 A1 Nov. 10, 2022

Related U.S. Application Data

(63) Continuation of application No. 16/865,564, filed on May 4, 2020, now Pat. No. 11,432,168.

(51) Int. Cl.
| | |
|---|---|
| *F24F 11/30* | (2018.01) |
| *F24F 11/58* | (2018.01) |
| *H01Q 1/22* | (2006.01) |
| *H04W 24/02* | (2009.01) |
| *H04W 76/14* | (2018.01) |
| *H01Q 1/44* | (2006.01) |
| *H01Q 21/00* | (2006.01) |
| *H04W 8/00* | (2009.01) |
| *H04W 48/08* | (2009.01) |
| *H04B 7/06* | (2006.01) |

(52) U.S. Cl.
CPC .............. *H04W 24/02* (2013.01); *H01Q 1/44* (2013.01); *H01Q 21/00* (2013.01); *H04B 7/0602* (2013.01); *H04W 8/005* (2013.01); *H04W 48/08* (2013.01); *H04W 76/14* (2018.02); *G05B 2219/2614* (2013.01)

(58) Field of Classification Search
None
See application file for complete search history.

(56) References Cited

U.S. PATENT DOCUMENTS

| | | | | |
|---|---|---|---|---|
| 7,123,139 B2 * | 10/2006 | Sweeney | ................ | G08B 19/00 340/567 |
| 7,737,360 B2 * | 6/2010 | Wiemeyer | ................ | H04Q 1/13 361/679.01 |
| 8,289,226 B2 * | 10/2012 | Takach | ..................... | H01Q 1/22 343/907 |
| 8,760,269 B2 * | 6/2014 | Feldstein | .............. | G06F 1/1626 340/13.22 |

(Continued)

*Primary Examiner* — Tuan A Tran
(74) *Attorney, Agent, or Firm* — Shackelford, Bowen, McKinley & Norton, LLP

(57) ABSTRACT

In an embodiment, a multiple-antenna heating, ventilation and air conditioning (HVAC) system includes a first antenna disposed along a return airflow path from an enclosed space to the multiple-antenna HVAC system, where the multiple-antenna HVAC system supplies conditioned air to the enclosed space. The multiple-antenna HVAC system also includes a second antenna disposed outside the return airflow path. The multiple-antenna HVAC system also includes a controller in communication with the first antenna and the second antenna, where the controller wirelessly communicates via the first antenna and the second antenna.

20 Claims, 5 Drawing Sheets

(56) References Cited

U.S. PATENT DOCUMENTS

| | | | | |
|---|---|---|---|---|
| 9,191,886 B2* | 11/2015 | Ludlow | ................ | H04W 48/18 |
| 9,303,890 B2* | 4/2016 | Haines | ..................... | F24F 11/30 |
| 9,513,642 B2* | 12/2016 | Rogers | ............... | G05D 23/1917 |
| 10,082,308 B2* | 9/2018 | Erickson | ............ | G05B 19/0428 |
| 10,317,261 B2* | 6/2019 | Noboa | ................... | F25B 13/00 |
| 10,317,862 B2* | 6/2019 | Ajax | ..................... | F24F 3/044 |
| 10,443,876 B2* | 10/2019 | Erickson | .................. | F24F 11/62 |
| 10,508,822 B1* | 12/2019 | Sheikh | ..................... | F24F 11/52 |
| 10,887,776 B2* | 1/2021 | Bahr | ...................... | H04W 88/08 |
| 11,274,844 B2* | 3/2022 | Hoglund | ..................... | F24F 11/63 |
| 2005/0194456 A1* | 9/2005 | Tessier | ..................... | F24F 11/30 |
| | | | | 236/51 |
| 2018/0238574 A1* | 8/2018 | Ky | ...................... | H01Q 1/2291 |
| 2018/0331935 A1 | 11/2018 | Ross et al. | | |
| 2019/0049143 A1* | 2/2019 | Myers | ..................... | F24F 13/20 |

* cited by examiner

SELF-CONFIGURING MULTIPLE-ANTENNA SYSTEM

CROSS-REFERENCE TO RELATED APPLICATIONS

This application is a continuation of U.S. patent application Ser. No. 16/865,564, filed on May 4, 2020. U.S. patent application Ser. No. 16/865,564 is incorporated herein.

BACKGROUND

Technical Field

The present disclosure relates generally to heating, ventilation, and air conditioning (HVAC) systems and more particularly, but not by way of limitation, to systems and methods for self-configuring multiple-antenna HVAC systems.

History of Related Art

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). More recently, HVAC systems are sometimes capable of network communication with other devices.

SUMMARY OF THE INVENTION

In some embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of self-configuring a multiple-antenna system. The method includes searching, via a first antenna of the multiple-antenna system, for non-mesh connection points to a wireless network may include a meshnet. The method also includes, responsive to the searching for non-mesh connection points, determining whether a non-mesh connection point, in satisfaction of non-mesh signal criteria, has been identified. The method also includes, responsive to a determination that no non-mesh connection point, in satisfaction of non-mesh signal criteria, has been identified, searching, via a second antenna, for mesh connection points to the wireless network over the meshnet. The method also includes, responsive to the searching for mesh connection points, determining whether a mesh connection point, in satisfaction of mesh signal criteria, has been identified. The method also includes, responsive to a determination that a mesh connection point, in satisfaction of mesh signal criteria, has been identified, connecting to the wireless network using the mesh connection point and the second antenna. Other embodiments of this aspect include corresponding computer systems, apparatus, and computer programs recorded on one or more computer storage devices, each configured to perform the actions of the methods.

In an embodiment, another general aspect includes a multiple-antenna heating, ventilation and air conditioning (HVAC) system. The multiple-antenna HVAC system includes a first antenna disposed along a return airflow path from an enclosed space to the multiple-antenna HVAC system, where the multiple-antenna HVAC system supplies conditioned air to the enclosed space. The multiple-antenna HVAC system also includes a second antenna disposed outside the return airflow path. The multiple-antenna HVAC system also includes a controller in communication with the first antenna and the second antenna, where the controller wirelessly communicates via the first antenna and the second antenna. Other embodiments of this aspect include corresponding computer systems, apparatus, and computer programs recorded on one or more computer storage devices, each configured to perform the actions of the methods.

In an embodiment, another general aspect includes a multiple-antenna system. The multiple—antenna system includes a first antenna disposed along a return airflow path from an enclosed space in a building to an exterior of the building. The multiple-antenna system also includes a second antenna disposed outside the return airflow path. The multiple-antenna system also includes a controller in communication with the first antenna and the second antenna, where the controller wirelessly communicates via the first antenna and the second antenna. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
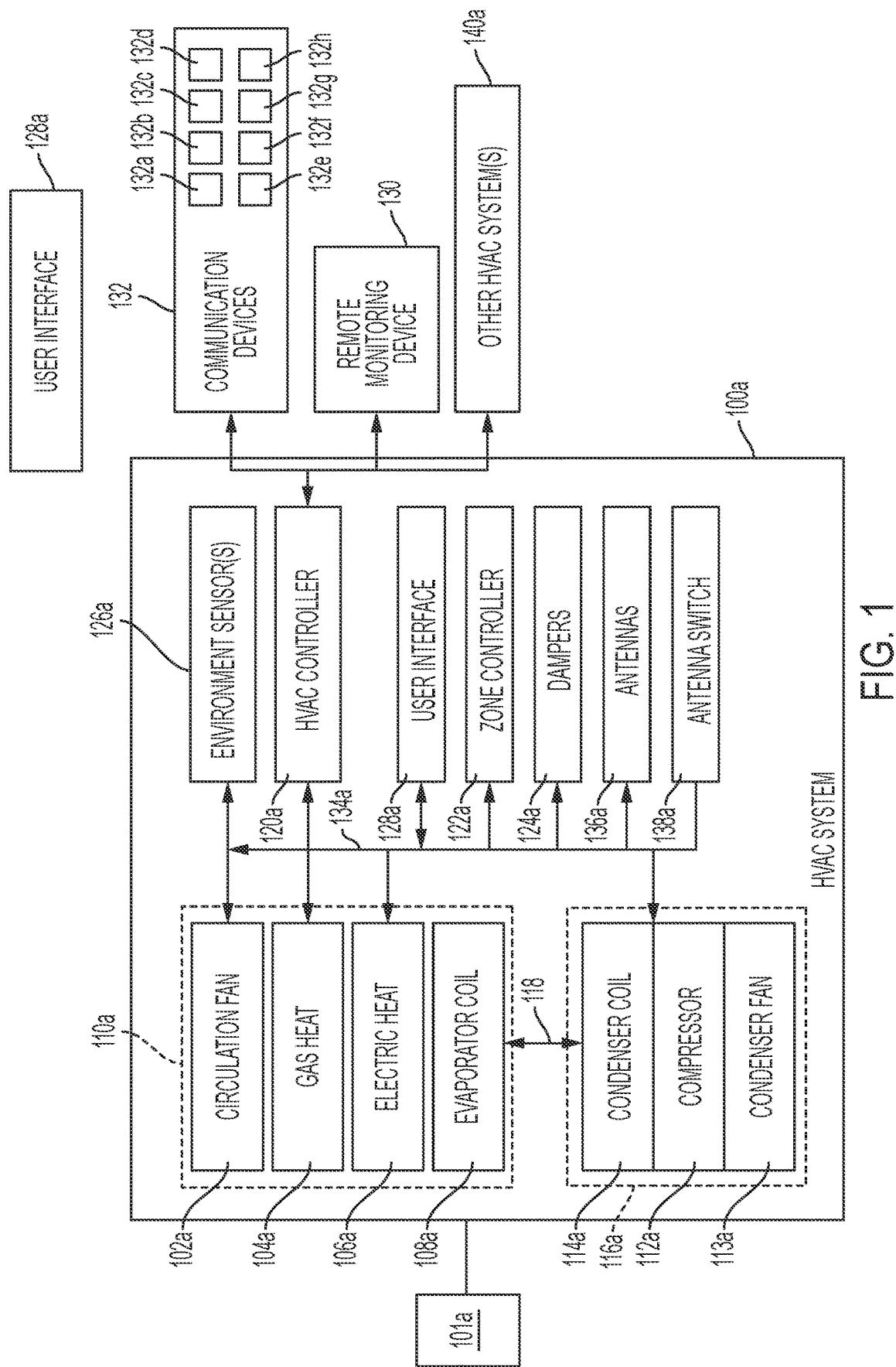
FIG. 1 is a block diagram of an illustrative heating, ventilation, and air conditioning (HVAC) system.

FIG. 1 illustrates a heating, ventilation and air conditioning (HVAC) system 100a. In a typical embodiment, the HVAC system 100a is a networked HVAC system configured to condition air via, for example, heating, cooling, humidifying, or dehumidifying. For illustration, the HVAC system 100a as illustrated in FIG. 1 includes various components; however, in other embodiments, the HVAC system 100a may include additional components that are not illustrated but typically included within HVAC systems. The HVAC system 100a can be a residential system or a commercial system such as, for example, a roof top system.

The HVAC system 100a includes a variable-speed circulation fan 102a, a gas heat 104a, electric heat 106a typically associated with the variable-speed circulation fan 102a, and a refrigerant evaporator coil 108a, also typically associated with the variable-speed circulation fan 102a. For illustrative purposes, only variable-speed circulation fan 102a is disclosed; however, in other embodiments, fixed speed and multi-speed circulation fans may be used as required. The variable-speed circulation fan 102*a*, the gas heat 104*a*, the electric heat 106*a*, and the refrigerant evaporator coil 108*a* are collectively referred to as an "indoor unit" 110*a*. In a typical embodiment, the indoor unit 110*a* is located within, or in close proximity to, an enclosed space 101*a*. The HVAC system 100*a* also includes a variable-speed compressor 112*a*, an associated condenser coil 114*a*, and a condenser fan 113*a*, which are typically referred to as an "outdoor unit" 116*a*. In a typical embodiment, the condenser fan 113*a* may be at least one of a fixed-speed condenser fan, a multi-speed condenser fan, and a variable-speed condenser fan. In various embodiments, the outdoor unit 116*a* is, for example, a rooftop unit or a ground-level unit. The variable-speed compressor 112*a* and the associated condenser coil 114*a* are connected to an associated evaporator coil 108*a* by a refrigerant line 118. In a typical embodiment, the variable-speed compressor 112*a* is, for example, a single-stage compressor, a multi-stage compressor, a single-speed compressor, or a variable-speed compressor. The variable-speed circulation fan 102*a*, sometimes referred to as an air blower, is configured to operate at different capacities (i.e., variable motor speeds) to circulate air through the HVAC system 100*a*, whereby the circulated air is conditioned and supplied to the enclosed space 101*a*. For illustrative purposes, only variable-speed compressor 112*a* is disclosed; however, in other embodiments, fixed speed and multi-stage compressors may be used as required.

In the embodiment shown in FIG. 1, the HVAC system 100*a* includes antennas 136*a* and an antenna switch 138*a* so as to facilitate configurable wireless communication. In various embodiments, the antennas 136*a* enable communication according to various wireless standards such as, for example, IEEE 802.11, Bluetooth, variations or extensions of the foregoing, combinations of the foregoing, and/or the like. In various embodiments, the antennas 136*a* can be positioned in various locations throughout the HVAC system 100*a* and/or in ductwork for the same. In some cases, the individual positions of the antennas 136*a* can advantageously facilitate communication with wireless networks of particular types and/or wireless networks in particular locations.

As described in greater detail relative to FIG. 3, in various embodiments, the antenna switch 138*a* enables a controller 320 (described below) to accommodate a greater number of transmit/receive antennas, such as multiple-input and multiple-output (MIMO) antennas. In such scenarios, the antenna switch 138*a* is controllable to select, at least in part, which antenna or antennas of the antennas 136*a* are in use at a given time. In some embodiments, such as when the HVAC controller 120*a* directly supports a desired number of the antennas 136*a* in the desired fashion, the antenna switch 138*a* can be omitted.

Still referring to FIG. 1, the HVAC system 100*a* includes an HVAC controller 120*a* that is configured to control operation of the various components of the HVAC system 100*a* such as, for example, the variable-speed circulation fan 102*a*, the gas heat 104*a*, the electric heat 106*a*, the variable-speed compressor 112*a*, and the condenser fan 113*a*. In some embodiments, the HVAC system 100*a* can be a zoned system. In such embodiments, the HVAC system 100*a* includes a zone controller 122*a*, dampers 124*a*, and a plurality of environment sensors 126*a*. In a typical embodiment, the HVAC controller 120*a* cooperates with the zone controller 122*a* and the dampers 124*a* to regulate the environment of the enclosed space 101*a*.

The HVAC controller 120*a* may be an integrated controller or a distributed controller that directs operation of the HVAC system 100*a*. In a typical embodiment, the HVAC controller 120*a* includes an interface to receive, for example, thermostat calls, component health data, temperature setpoints, air blower control signals, environmental conditions, and operating mode status for various zones of the HVAC system 100*a*. In a typical embodiment, the HVAC controller 120*a* also includes a processor and a memory to direct operation of the HVAC system 100*a* including, for example, a speed of the variable-speed circulation fan 102*a*.

Still referring to FIG. 1, in some embodiments, the plurality of environment sensors 126*a* are associated with the HVAC controller 120*a* and also optionally associated with a user interface 128*a*. In some embodiments, the user interface 128*a* provides additional functions such as, for example, operational, diagnostic, status message display, and a visual interface that allows at least one of an installer, a user, a support entity, and a service provider to perform actions with respect to the HVAC system 100*a*. In some embodiments, the user interface 128*a* is, for example, a thermostat of the HVAC system 100*a*. In other embodiments, the user interface 128*a* is associated with at least one sensor of the plurality of environment sensors 126*a* to determine the environmental condition information and communicate that information to the user. The user interface 128*a* may also include a display, buttons, a microphone, a speaker, or other components to communicate with the user. Additionally, the user interface 128*a* may include a processor and memory that is configured to receive user-determined parameters, and calculate operational parameters of the HVAC system 100*a* as disclosed herein.

In a typical embodiment, the HVAC system 100*a* is configured to communicate with a plurality of devices such as, for example, a monitoring device 130, communication devices 132, other HVAC systems 140*a*, and the like. In a typical embodiment, the monitoring device 130 is not part of the HVAC system 100*a*. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In certain embodiment, the other HVAC systems 140*a* can operate as generally described relative to the HVAC system 100*a*. In various cases, the HVAC system 100*a* can communicate with the other HVAC systems 140*a* using one or more of the antennas 136*a*. In some embodiments, the HVAC system 100*a* and the other HVAC systems 140*a* can form, and communicate via, a mesh network (hereinafter, "meshnet"). Operability of the HVAC system 100*a* and the other HVAC systems 140*a* to intercommunicate will be described in greater detail with respect to FIGS. 2-5.

In a typical embodiment, the communication devices 132 are non-HVAC devices having a primary function that is not associated with HVAC systems. In some embodiments, non-HVAC devices include mobile-computing devices that are configured to interact with the HVAC system 100*a* to monitor and modify at least some of the operating parameters of the HVAC system 100*a*. Mobile computing devices may be, for example, a personal computer (e.g., desktop or laptop), a tablet computer, a mobile device (e.g., smart phone), and the like. In other embodiments, non-HVAC devices include devices that are configured to interact with the HVAC system 100*a* such that their operation can be controlled by the HVAC system 100*a*. According to exemplary embodiments, the non-HVAC devices may be devices whose operation can be controlled via the controller 120a of the HVAC system 100a such as, for example, ceiling fans 132a, 132b, 132c, exhaust fans 132d, 132e, 132f, smoke detectors 132g, 132h, and the like. In a typical embodiment, the communications devices 132 such as, for example, the ceiling fans 132a, 132b, 132c, the exhaust fans 132d, 132e, 132f, and the smoke detectors 132g, 132h are configured to communicate with the HVAC controller 120a. In some embodiments, the data bus 134a may couple the HVAC controller 120a to the communication devices 132. For example, a wireless connection is employed to provide at least some of the connections between the HVAC controller 120a and the communication devices 132. In a typical embodiment, the communication devices 132 include at least one processor, memory and a user interface, such as a display. One skilled in the art will also understand that the communication devices 132 disclosed herein include other components that are typically included in such devices including, for example, a power supply, a communications interface, and the like.

The zone controller 122a is configured to manage movement of conditioned air to designated zones of the enclosed space. Each of the designated zones include at least one conditioning or demand unit such as, for example, the gas heat 104a and at least one user interface 128a such as, for example, the thermostat. The zone-controlled HVAC system 100a allows the user to independently control the temperature in the designated zones. In a typical embodiment, the zone controller 122a operates electronic dampers 124a to control air flow to the zones of the enclosed space.

In some embodiments, a data bus 134a, which in the illustrated embodiment is a serial bus, couples various components of the HVAC system 100a together such that data is communicated therebetween. In a typical embodiment, the data bus 134a may include, for example, any combination of hardware, software embedded in a computer readable medium, or encoded logic incorporated in hardware or otherwise stored (e.g., firmware) to couple components of the HVAC system 100a to each other. As an example and not by way of limitation, the data bus 134a may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134a may include any number, type, or configuration of data buses 134a, where appropriate. In particular embodiments, one or more data buses 134a (which may each include an address bus and a data bus) may couple the HVAC controller 120a to other components of the HVAC system 100a. In other embodiments, connections between various components of the HVAC system 100a are wired. For example, conventional cable and contacts may be used to couple the HVAC controller 120a to the various components. In some embodiments, a wireless connection is employed to provide at least some of the connections between components of the HVAC system 100a such as, for example, a connection between the HVAC controller 120a and the variable-speed circulation fan 102a or the plurality of environment sensors 126a.

Figure 2:
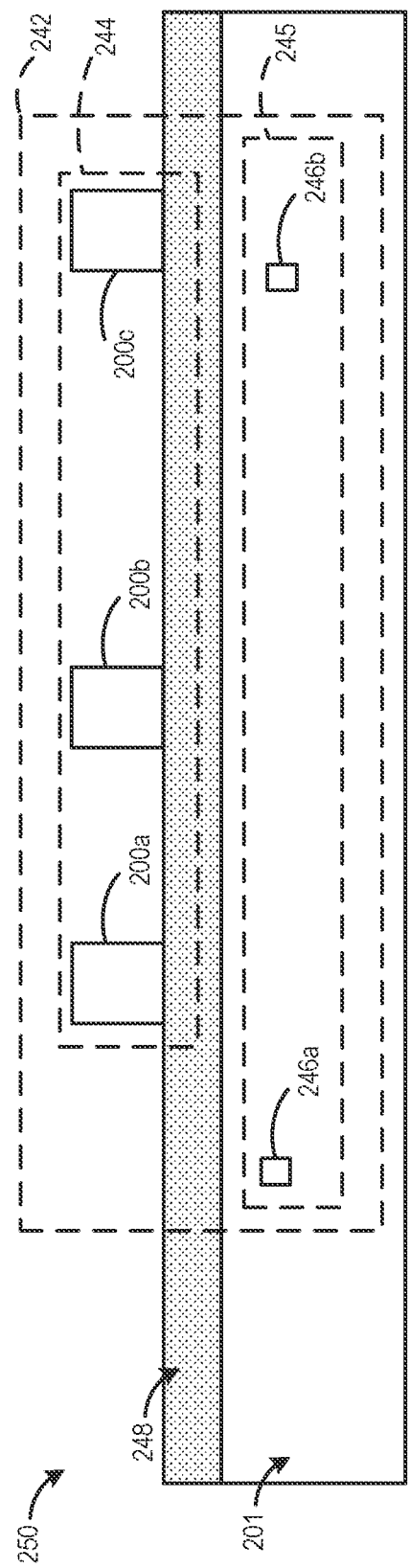
FIG. 2 illustrates an example HVAC deployment for a building.

FIG. 2 illustrates an example HVAC deployment for a building 250 that utilizes a wireless network 242. The wireless network 242 includes a meshnet 244 and a wireless backbone 245 that are separated from each other by a physical barrier 248. The meshnet 244 includes HVAC systems 200a, 200b, and 200c (collectively, HVAC systems 200), each of which can operate as described with respect to the HVAC system 100a of FIG. 1, for example, so as to supply conditioned air to an enclosed space 201 or a portion thereof. The wireless backbone 245 includes wireless networking devices 246a and 246b (collectively, wireless networking devices 246) that are situated within the enclosed space 201.

In the illustrated embodiment, the HVAC systems 200 are rooftop or package units, in which case the physical barrier 248 can include a roof and/or other intervening building materials and spaces that separate the HVAC systems 200 from the enclosed space 201. Although a rooftop deployment of the HVAC systems 200 is illustrated in FIG. 2, it should be appreciated that other types of deployments are also contemplated without deviating from the principles described herein. For example, in some embodiments, the HVAC systems 200 can be located at ground level outside the building 250. In these embodiments, the physical barrier 248 can include an exterior wall of the building 250 and/or other intervening building materials and spaces that separate the HVAC systems 200 from the enclosed space 201. Other examples will be apparent to one skilled in the art after reviewing the present disclosure. Although many types of deployments are contemplated by the present disclosure, for illustrative purposes, examples will be described herein relative to rooftop deployment.

In general, the wireless networking devices 246 provide direct access to the wireless backbone 245, with each of the wireless networking devices 246 centrally managing its own connections thereto. In various embodiments, the wireless backbone 245 provides access to one or more of a wired network, a proprietary corporate network and/or various infrastructure services such as, for example, the Internet or portions thereof. In certain embodiments, the wireless networking devices 246 of the wireless backbone 245 can be, for example, wireless access points, switches, hubs, a repeater or extender of the foregoing, combinations of the foregoing and/or the like, with the terminology varying in correspondence to particular wireless standards and protocols.

In certain embodiments, the physical barrier 248 and/or a physical distance from the wireless networking devices 246 may impede an ability of some or all of the HVAC systems 200 to connect to the wireless backbone 245. Advantageously, in certain embodiments, the HVAC systems 200 can form a mesh topology in which one or more of the HVAC systems 200 connect directly to the wireless backbone 245, while one or more others of the HVAC systems 200 connect directly, dynamically and non-hierarchically to each other and cooperate with one another to efficiently route data to and from the wireless backbone 245. In some embodiments, the meshnet 244 can comply with a wireless protocol such as IEEE 802.11s or a customization or extension thereof.

For clarity, connections involving one or more of the HVAC systems 200 will be described in terms of a parent-child relationship. In such a connection, the node that is closer to the wireless backbone 245, as measured by a number of connections between it and the wireless backbone 245, will be referred to as a "parent node." The other node in such a connection will be referred to as a "child node." The parent node in the connection serves as the child node's link to the wireless backbone 245 for incoming and outgoing data. In various cases, the parent node may be one of the wireless networking devices 246 or another of the HVAC systems 200.

For ease of reference, the wireless networking devices 246 and the HVAC systems 200 will be periodically referred to herein as "non-mesh connection points" and "mesh connection points," respectively. Similarly, any of the HVAC systems 200 that connects directly to a non-mesh connection point, such as any of the wireless networking devices 246, will be referred to herein as a "root node" in the meshnet 244. Root nodes in the meshnet 244 may be referred to as having a "non-mesh parent," while all other nodes in the meshnet 244 may be referred to as having a "mesh parent." In various embodiments, there can be more than one root node in the meshnet 244. In some embodiments, all nodes in the meshnet 244 can be root nodes.

In certain embodiments, the HVAC systems 200 can each independently and periodically execute a self-configuration process that causes it to connect to, and thus have as its parent node, either one of the wireless networking devices 246 or another of the HVAC systems 200. It should be appreciated that the HVAC systems 200 are child nodes in such connections. In a typical embodiment, the HVAC systems 200, once connected to a parent node, make themselves available to serve as parent nodes to additional HVAC systems seeking to join the meshnet 244. The HVAC systems 200 can increase or decrease in number as HVAC systems join or leave the meshnet 244. The self-configuration process can repeated, for example, at configurable intervals (e.g., hourly, daily, weekly, etc.), upon configurable trigger events such as, for example, connection loss or poor connection quality (e.g., as measured by one or more parameters such as received signal strength indicator(s), throughput measurement(s), and/or packet loss), and/or responsive to a manual trigger by a user or administrator. Advantageously, in various embodiments, when the self-configuration process is independently and periodically executed by many HVAC systems such as the HVAC systems 200, it can cumulatively create, configure and/or reconfigure the meshnet 244 without user or administrator intervention. An example of the self-configuration process will be described in greater detail relative to FIG. 5.

Figure 3:
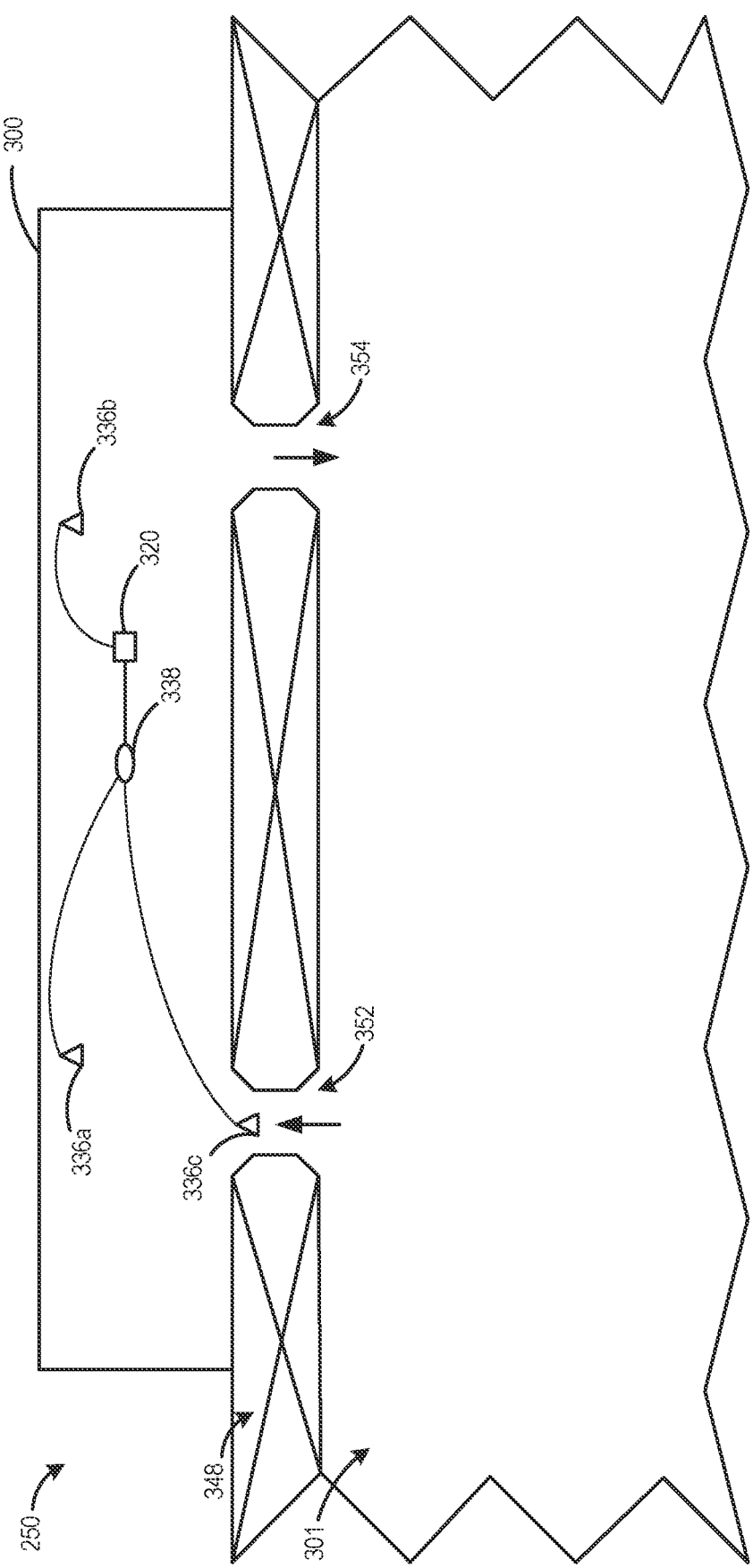
FIG. 3 illustrates an example antenna configuration for an HVAC system.

FIG. 3 illustrates an example antenna configuration for an HVAC system 300 that is deployed in relation to the building 250 of FIG. 2. For purposes of the example of FIG. 3, the HVAC system 300 may be considered one of the HVAC systems 200 of FIG. 2. In that way, an enclosed space 301 and a physical barrier 348 may be a portion or subset of the enclosed space 201 and the physical barrier 248, respectively, of FIG. 2. The HVAC system 300 is shown to include antennas 336a, 336b and 336c (collectively, antennas 336), an antenna switch 338 and a controller 320.

In the illustrated embodiment, the antennas 336a and 336b are disposed outside of (or external to) the enclosed space 301 and within the HVAC system 300, for example, near, at, or on a top of the HVAC system 300. The antenna 336c is disposed in or along a return airflow path 352 to the HVAC system 300. In various embodiments, the antenna 336c can be positioned (e.g., centered) in a return air opening of the HVAC system 300, for example, so as to enable factory installation. In some of these embodiments, the antenna 336c can be field-installed. In other embodiments, the antenna 336c can be field-installed in a return air duct for the return airflow path 352.

In certain embodiments, the position of the antenna 336c in or along the return airflow path 352 renders the antenna 336c more suitable for use in wirelessly communicating with devices on an interior or opposite side of the physical barrier 348, such as the wireless networking devices 246 of FIG. 2. In these embodiments, an existing open path through the physical barrier 348, in the form of the return airflow path 352, can be leveraged to improve signal strength and quality and to enable wireless communication that otherwise may not have been feasible. Although the antenna 336c is shown within the return airflow path 352 for illustrative purposes, in some embodiments, it is contemplated that the antenna 336c could instead be similarly placed in a supply airflow path 354.

In certain embodiments, the antennas 336 can each be a MIMO radio antenna that facilitates connections with other nodes in correspondence to its position or location within the HVAC system 300. In an example, the antennas 336a and 336b, as a result of being located external to the enclosed space 301 and within the HVAC system 300, may be favorably positioned for wireless communication with other HVAC systems such as the HVAC systems 200 of FIG. 2. In another example, the antenna 336c, as a result of being located in or along the return airflow path 352, may be favorably positioned for wireless communication with networking devices that may be situated in the enclosed space 301 such as, for example, the wireless networking devices 246 of FIG. 2.

In various embodiments, the antennas 336 can facilitate parent-node communication and child-node communication. Parent-node communication can include, for example, wireless communication to discover, establish, or use a connection with a parent node. Child-node communication can include, for example, wireless communication that allows other systems to discover, establish, or use a connection therewith as a child node. In the example of FIG. 3, parent-node communication is delegated to the antenna 336a and the antenna 336c, while child-node communication is delegated to the antenna 336b. It should be appreciated that the foregoing is provided only as an illustrative example, and that communication can be handled differently to suit a given implementation.

In the example of FIG. 3, the controller 320 is a 2×2 MIMO device so as to accommodate two MIMO antennas. According to this example, the antenna switch 338 can enable accommodation, for example, of three MIMO antennas. In particular, as shown in FIG. 3, the antenna 336a and the antenna 336c are coupled to the antenna switch 338, which is in turn coupled to the controller 320. In various embodiments, the antenna switch 338 can be a radio frequency (RF) switch such as, for example, a PIN diode-based switch or a mechanical switch. More generally, the antenna switch 338 can be any kind of switch that is controllable by the controller 320 to select between the antenna 336a and the antenna 336c. As shown in FIG. 3, the antenna 336b is directly coupled to the controller 320 and thus need not be selected, for example, for child-node communication.

In certain embodiments, the controller 320 can control the antenna switch 338 to select the antenna 336a or the antenna 336c for parent-node communication. Antenna selection by the controller 320 can leverage respective positions of the antenna 336a and the 336c. In a typical embodiment, since the antenna 336a has a generally more favorable position relative to the HVAC systems 200 than the antenna 336c, the antenna 336a is selected for parent-node communication with mesh connection points. In similar fashion, since the antenna 336c has a generally more favorable position relative to the wireless networking devices 246 than the antenna 336a, the antenna 336c is selected for parent-node communication with non-mesh connection points. In various embodiments, antenna selection can be performed by the controller 320 during a self-configuration process. An example of the self-configuration process will be described relative to FIG. 5.

The antenna switch 338 can be omitted in many implementations. For example, in implementations in which the controller 320 is a 3×3 MIMO device, the antenna switch 338 may be omitted. More generally, if the controller 320 directly supports a desired number of the antennas 336 in the desired fashion, the antenna switch 338 can be omitted. By way of further example, in some implementations, the functionality of the antenna switch 338 can be subsumed within the controller 320 and likewise be omitted.

In similar fashion, it should be appreciated that the three antennas shown in FIG. 3 and described above are merely illustrative in nature. In various embodiments, the antennas 336 can include any number of antennas to suit a given implementation. For example, the antenna 336a, the antenna 336b and the antenna 336c can each be representative of a group of antennas that are similarly positioned and perform the example functions described above. According to this example, the antenna switch 338 can be correspondingly configured to switch between the respective groups of antennas corresponding to the antenna 336a and the antenna 336c. Other examples and variations will be apparent to one skilled in the art after reviewing the present disclosure.

Figure 4:
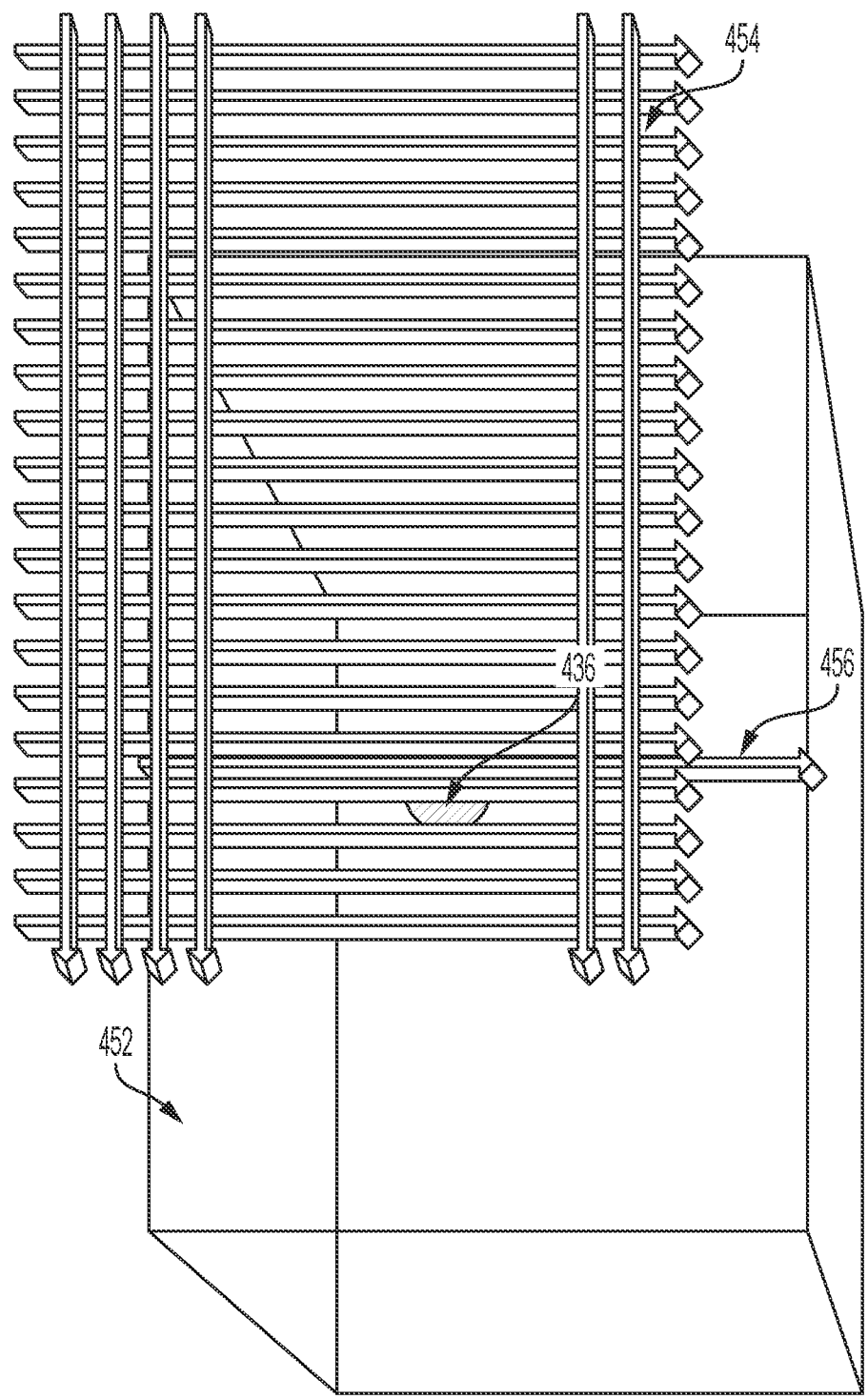
FIG. 4 illustrates an example placement of an antenna along a return airflow path.

FIG. 4 illustrates an example placement of an antenna 436 in or along a return airflow path 452. In general, the antenna 436 can be considered an example of the antenna 336c of FIG. 3. In the example of FIG. 4, a reflective vent 454 is positioned in the return airflow path 452. The antenna 436 is secured to a return side of the reflective vent 454 via an antenna mount 456.

Advantageously, in certain embodiments, the reflective vent 454 can behave as a "feed horn" to reflect RF signals into the return airflow path 452 and into an enclosed space such as the enclosed space 201 of FIG. 2. In various embodiments, the reflective vent 454 can take the form of a metal grating or the like with openings large enough to allow return airflow but small enough to reflect RF, for example, at 2.4 gigahertz. In certain embodiments, a length (or diameter, as the case may be) of openings in the reflective vent 454 can be, for example, less than or equal to a tenth of an applicable wavelength (e.g., 1.25 centimeters for 2.4 gigahertz) so as to optimize signal reflection.

Figure 5:
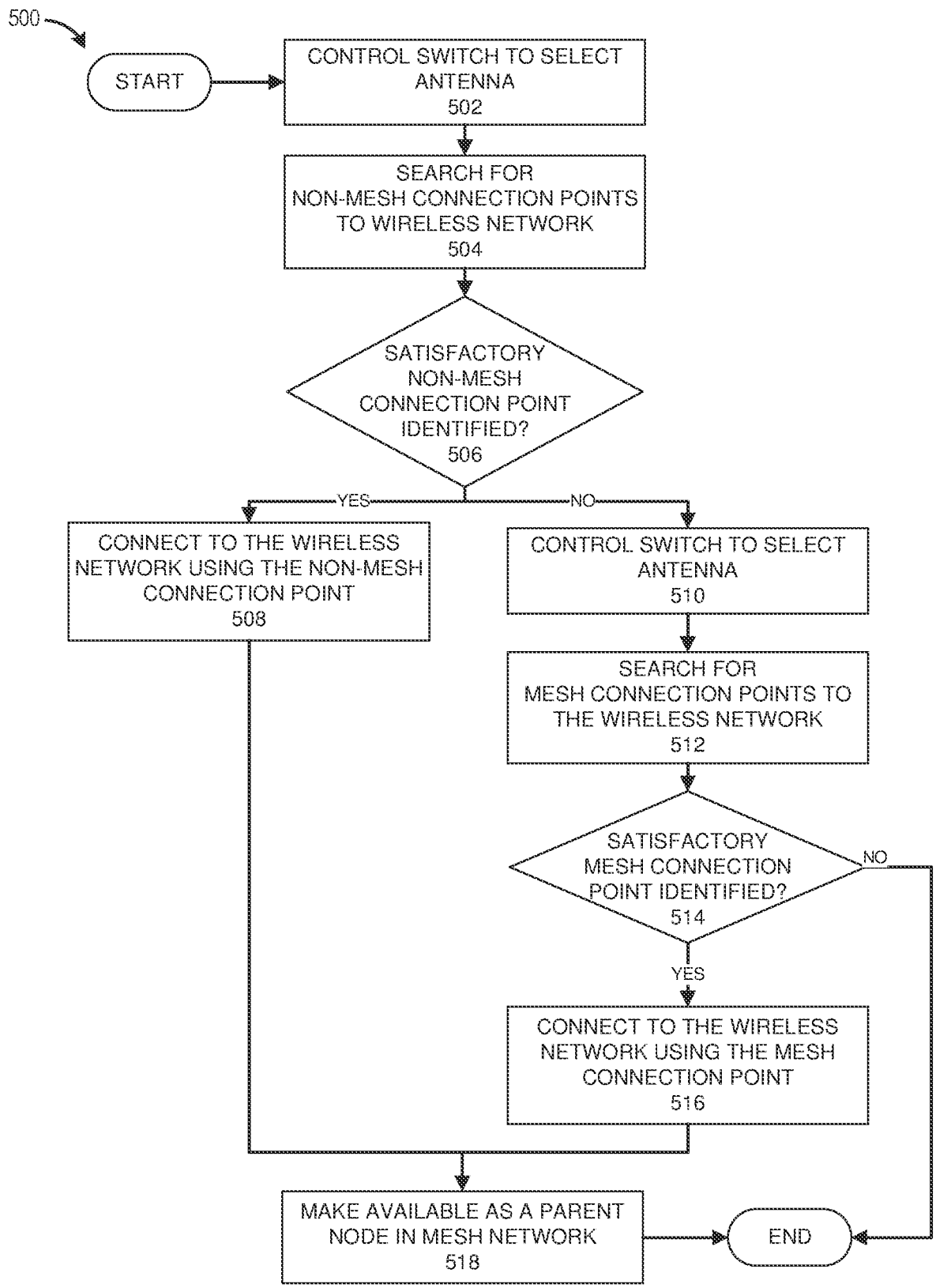
FIG. 5 illustrates an example of a process for self-configuring a multiple-antenna HVAC system.

FIG. 5 illustrates an example of a process 500 for self-configuring a multiple-antenna HVAC system. In various embodiments, the process 500 can be independently and periodically executed by each HVAC system in use at a given building such as the building 250 of FIGS. 2-3. For example, in various embodiments, the process 500 can be independently and periodically executed by each of the HVAC systems 200 or a component thereof. Although any number of systems or components can execute the process 500, for simplicity of description, the process 500 will be described relative the building 250 of FIGS. 2-3, with particular focus on the HVAC system 300 of FIG. 3.

At block 502, the controller 320 of the HVAC system 300 controls the antenna switch 338 to select the antenna 336c for parent-node communication. In embodiments not using an antenna switch such as the antenna switch 338, the block 502 can be omitted. At block 504, the controller 320 searches for non-mesh connection points to the wireless network 242. In certain embodiments, the block 504 can involve the controller 320 using the antenna 336c to search for wireless networking devices, such as the wireless networking devices 246, which satisfy specified non-mesh signal criteria. In some embodiments, the controller 320 can apply a timeout period at the block 504 (e.g., defined in terms of seconds or minutes).

In general, the non-mesh signal criteria used at the block 504 can be specified in memory within or accessible to the controller 320 or the HVAC system 300, hardcoded into programming executed by the controller 320, and/or otherwise provided or communicated to the controller 320. The non-mesh signal criteria can include, for example, one or more thresholds specified in terms of any parameter or combination of parameters that are indicative of connection quality. Example parameters include, without limitation, received signal strength indicator(s), throughput measurement(s), and packet loss measurement(s) such as frame loss rate.

At decision block 506, the controller 320 determines whether a non-mesh connection point, in satisfaction of the non-mesh signal criteria, has been identified. In various embodiments, more than one non-mesh connection point may satisfy the non-mesh signal criteria. In such cases, the identified non-mesh connection point can be a non-mesh connection point deemed best, for example, in terms of any given parameter or combination of parameters such as received signal strength indicator(s), throughput measurement(s), and/or packet loss measurement(s) such as frame loss rate. If it is determined, at the decision block 506, that a non-mesh connection point, in satisfaction of the non-mesh signal criteria, has been identified, the process 500 proceeds to block 508. At block 508, the controller 320 connects to the wireless network 242 using the antenna 336c and the non-mesh connection point, with the non-mesh connection point thereby becoming the parent node of the HVAC system 300. From block 508, the process 500 proceeds to block 518 (described further below).

If it is determined, at the decision block 506, that no non-mesh connection point, in satisfaction of the non-mesh signal criteria, has been identified, the process 500 proceeds to block 510. At block 510, the controller 320 controls the antenna switch 338 to select the antenna 336a for parent-node communication. In embodiments not using an antenna switch such as the antenna switch 338, the block 510 can be omitted. At block 512, the controller 320 searches for mesh connection points to the wireless network 242. In certain embodiments, the block 504 can involve the controller 320 using the antenna 336a to search for HVAC systems, such as the HVAC systems 200, which satisfy specified mesh signal criteria. In some embodiments, the controller 320 can apply a timeout period at the block 512 (e.g., defined in terms of seconds or minutes).

In general, the mesh signal criteria used at the block 512 can be specified in memory within or accessible to the controller 320 or the HVAC system 300, hardcoded into programming executed by the controller 320, and/or otherwise provided or communicated to the controller 320. The mesh signal criteria can include, for example, one or more thresholds specified in terms of any parameter or combination of parameters that are indicative of connection quality. Example parameters include, without limitation, received signal strength indicator(s), throughput measurement(s), and packet loss measurement(s) such as frame loss rate. The mesh signal criteria can be the same as, or different from, the non-mesh signal criteria.

At decision block 514, the controller 320 determines whether a mesh connection point, in satisfaction of the mesh signal criteria, has been identified. In various embodiments, more than one mesh connection point may satisfy the mesh signal criteria. In such cases, the identified mesh connection point can be a mesh connection point deemed best, for example, in terms of any given parameter or combination of parameters such as received signal strength indicator(s), throughput measurement(s), and/or packet loss measurement(s) such as frame loss rate. If it is determined, at the decision block 514, that no mesh connection point, in satisfaction of the mesh signal criteria, has been identified, the process 500 ends without any connection having been established. In various embodiments, the process 500 can be repeated by the controller 320 after a configurable interval such as, for example, a defined number of seconds or minutes. Otherwise, if it is determined, at the decision block 514, that a mesh connection point, in satisfaction of the mesh signal criteria, has been identified, the process 500 proceeds to block 516. At block 516, the controller 320 connects to the wireless network 242 using the antenna 336a and the mesh connection point, with the mesh connection point thereby becoming the parent node of the HVAC system 300.

At block 518, the controller 320 uses the antenna 336b for child-node communication, for example, so as to make itself available as a parent node to other HVAC systems similar to the HVAC systems 200. In various embodiments, the controller 320 can establish or allow connections to such HVAC systems which execute a process similar to the process 500 of FIG. 5. After block 518, the process 500 ends.

In certain embodiments, when the process 500 is independently and periodically executed by multiple HVAC systems in the fashion described above, a meshnet similar to the meshnet 244 can be progressively created and reconfigured. In various embodiments, the process 500 as described above prioritizes non-mesh connection points over mesh connection points. In various embodiments, the process 500 could be modified to reflect different priorities, for example, by first searching for mesh connections points. In addition, or alternatively, the process 500 can be modified to connect to whichever mesh or non-mesh connection point is deemed best, for example, in terms of any given parameter or combination of parameters such as received signal strength indicator(s), throughput measurement(s), and/or packet loss measurement(s) such as frame loss rate, subject to there being at least one root node. Other variations and modifications will be apparent to one skilled in the art after reviewing the present disclosure.

Although various examples of a multiple-antenna HVAC system are described above, it should be appreciated that these examples are merely illustrative. In various embodiments, the principles of the present disclosure are similarly applicable to other systems and components that may be situated outside, or external to, an enclosed space in a building, such as the building 250 of FIG. 2, and that connect to a wireless network similar to the wireless network 242 of FIG. 2. For example, exterior systems such as lighting systems, security-system components, sensors or any other component or systems, whether fixed or mobile, may benefit from an ability to control and communicate with an antenna in a return airflow path from the enclosed space to a building exterior (e.g, to an HVAC system on a roof of the building). For example, these systems can connect to a non-mesh connection point in the enclosed space. Such systems can exist together, or instead of, an HVAC system such as the example HVAC systems described in the foregoing. In similar fashion to the HVAC systems described above relative to FIGS. 1-5, such systems can be multiple-antenna systems configured in a meshnet. In various embodiments, such systems can include like components or a hybrid of component types (e.g., including HVAC systems) that conform in communication protocol, for example, for purposes of establishing, configuring and re-configuring the meshnet.

In addition, or alternatively, in some embodiments, a microwave link can be installed or provided, for example, on top of a building, and connected or linked to such an antenna in the return airflow path. In these embodiments, the microwave link in combination with the antenna in the return airflow path can provide an advantageous connection point to a wireless network similar to the wireless network 242 of FIG. 2 without requiring additional physical penetration, for example, of a roof. Other examples will be apparent to one skilled in the art after a detailed review of the present disclosure.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of a processor (such as, for example, one or more internal registers or caches), one or more portions of memory, one or more portions of storage, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A multiple-antenna heating, ventilation, and air conditioning (HVAC) system for supplying conditioned air to an enclosed space comprising:
   a first antenna disposed centrally in a return air opening of the multiple-antenna HVAC system;
   a second antenna disposed external to the enclosed space;
   a controller in wireless communication with the first antenna and the second antenna;
   an antenna switch positioned external to the enclosed space; and
   wherein the antenna switch is controllable by the controller to select between the first antenna and the second antenna.

2. The multiple-antenna HVAC system of claim 1, wherein the controller:
   wirelessly communicates with a wireless networking device in the enclosed space via the first antenna; and
   wirelessly communicates with another HVAC system outside the enclosed space via the second antenna.

3. The multiple-antenna HVAC system of claim 1, comprising:
   a third antenna disposed external to the enclosed space; and
   wherein the controller wirelessly communicates via the third antenna.

4. The multiple-antenna HVAC system of claim 3, wherein the controller, in a wireless network comprising a meshnet:
   wirelessly communicates with its parent node in the wireless network via at least one of the first antenna and the second antenna; and
   wirelessly communicates with a child node in the meshnet via the third antenna.

5. The multiple-antenna HVAC system of claim 1, comprising a reflective vent positioned in a return airflow path of the return air opening.

6. The multiple-antenna HVAC system of claim 5, wherein the first antenna is secured to a return side of the reflective vent.

7. The multiple-antenna HVAC system of claim 1, wherein the second antenna is disposed at a top of the multiple-antenna HVAC system.

8. The multiple-antenna HVAC system of claim 1, wherein the first antenna and the second antenna are each a multiple-input and multiple-output (MIMO) radio antenna.

9. A multiple-antenna heating, ventilation, and air conditioning (HVAC) system for supplying conditioned air to an enclosed space comprising:
   a first antenna disposed centrally in a return air opening of the multiple-antenna HVAC system;
   a second antenna disposed external to the enclosed space;
   a controller in wireless communication with the first antenna and the second antenna; and
   a reflective vent positioned in the return air opening, wherein the reflective vent is configured to reflect radio frequency (RF) signals into a return airflow path of the return air opening and into the enclosed space.

10. The multiple-antenna HVAC system of claim 9, wherein the first antenna is secured to a return side of the reflective vent.

11. The multiple-antenna HVAC system of claim 9, wherein the controller:
   wirelessly communicates with a wireless networking device in the enclosed space via the first antenna; and
   wirelessly communicates with another HVAC system outside the enclosed space via the second antenna.

12. The multiple-antenna HVAC system of claim 9, comprising a third antenna coupled to the controller, wherein the controller wireless communicates via the third antenna.

13. The multiple-antenna HVAC system of claim 12, wherein the controller, in a wireless network comprising a meshnet:

wirelessly communicates with its parent node in the wireless network via at least one of the first antenna and the second antenna; and wirelessly communicates with a child node in the meshnet via the third antenna.

14. The multiple-antenna HVAC system of claim 9, comprising:

an antenna switch coupled to the first antenna, the second antenna and the controller; and wherein the controller controls selection between the first antenna and the second antenna via the antenna switch.

15. The multiple-antenna HVAC system of claim 9, wherein the second antenna is disposed at a top of the multiple-antenna HVAC system.

16. The multiple-antenna HVAC system of claim 9, wherein the first antenna and the second antenna are each a multiple-input and multiple-output (MIMO) radio antenna.

17. The multiple-antenna HVAC system of claim 9, wherein the reflective vent comprises a metal grating.

18. The multiple-antenna HVAC system of claim 9, wherein the reflective vent comprises openings large enough to allow return airflow but small enough to reflect RF signals.

19. The multiple-antenna HVAC system of claim 9, wherein the openings are less than or equal to a tenth of an applicable wavelength.

20. A multiple-antenna heating, ventilation, and air conditioning (HVAC) system for supplying conditioned air to an enclosed space comprising:

a first antenna disposed centrally in a return air opening of the multiple-antenna HVAC system;

a second antenna disposed external to the enclosed space;

a third antenna disposed external to the enclosed space;

a controller in wireless communication with the first antenna, the second antenna and the third antenna;

wherein the controller is configured to:

wirelessly communicate with its parent node in a wireless network via at least one of the first antenna and the second antenna; and wirelessly communicate with a child node in a meshnet via the third antenna.

* * * * *